(12) United States Patent
Tyree

(10) Patent No.: US 9,077,609 B2
(45) Date of Patent: Jul. 7, 2015

(54) SCALABLE REUSABLE SCANNING OF APPLICATION NETWORKS/SYSTEMS

(75) Inventor: David S. Tyree, Centreville, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 754 days.

(21) Appl. No.: 12/632,028

(22) Filed: Dec. 7, 2009

(65) Prior Publication Data

US 2011/0138036 A1 Jun. 9, 2011

(51) Int. Cl.
| | |
|---|---|
| G06F 15/173 | (2006.01) |
| H04L 12/24 | (2006.01) |
| H04L 29/08 | (2006.01) |
| H04L 29/06 | (2006.01) |
| H04L 29/12 | (2006.01) |

(52) U.S. Cl.
CPC ......... *H04L 41/0226* (2013.01); *H04L 63/1408* (2013.01); *H04L 29/12226* (2013.01); *H04L 61/2015* (2013.01); *H04L 67/2823* (2013.01)

(58) Field of Classification Search
CPC .............. H04L 41/0253; H04L 67/025; H04L 41/0853; H04L 41/0293
USPC ........................................................ 709/224
See application file for complete search history.

(56) References Cited

U.S. PATENT DOCUMENTS

| | | | | |
|---|---|---|---|---|
| 6,907,531 | B1 * | 6/2005 | Dodd et al. | 726/25 |
| 7,472,422 | B1 * | 12/2008 | Agbabian | 726/25 |
| 7,536,456 | B2 * | 5/2009 | Williams et al. | 709/224 |
| 7,574,489 | B2 * | 8/2009 | Motoyama et al. | 709/219 |
| 7,712,138 | B2 * | 5/2010 | Zobel et al. | 726/25 |
| 7,845,007 | B1 * | 11/2010 | Kennis | 726/23 |
| 2004/0049693 | A1 * | 3/2004 | Douglas | 713/200 |
| 2005/0010821 | A1 * | 1/2005 | Cooper et al. | 713/201 |
| 2005/0015623 | A1 * | 1/2005 | Williams et al. | 713/201 |
| 2005/0257267 | A1 * | 11/2005 | Williams et al. | 726/25 |
| 2006/0101520 | A1 * | 5/2006 | Schumaker et al. | 726/25 |
| 2007/0027979 | A1 * | 2/2007 | Emerson et al. | 709/224 |
| 2007/0250935 | A1 * | 10/2007 | Zobel et al. | 726/26 |
| 2010/0043066 | A1 * | 2/2010 | Miliefsky | 726/9 |
| 2011/0065425 | A1 * | 3/2011 | Karaoguz et al. | 455/414.3 |
| 2012/0194845 | A1 * | 8/2012 | Scaff | 358/1.13 |

* cited by examiner

*Primary Examiner* — Brian P Whipple
*Assistant Examiner* — James Edwards

(57) ABSTRACT

A device schedules a scan of a group of devices associated with an application network/system, and receives, at a scheduled time, scan information from the group of devices, where the scan information is provided in different formats. The device also converts the scan information, in the different formats, into a single normalized format, and processes the normalized scan information to produce enriched, normalized scan information.

20 Claims, 8 Drawing Sheets

530 ➔

SCALABLE REUSABLE SCANNING OF APPLICATION NETWORKS/SYSTEMS

BACKGROUND

There are several application management systems that may provide services for application networks/systems (e.g., intranets, email systems, accounting systems, data networks, financial systems, etc.). The application networks/systems may be scanned for information, and the scanned information may be provided to the application management system. The scanned information may provide feedback (e.g., to the application management system) as to the performance of the application networks/systems. One example of such an application management system is a managed security services (MSS) system. A MSS system provides network security services (e.g., vulnerability assessments, management of firewalls, intrusion detection management, etc.) for another entity's application networks/systems. Another example of an application management system is a governance, risk management, and compliance (GRC) system. Examples of GRC systems include a financial GRC, an information technology (IT) GRC, etc. A GRC system may implement systems to monitor and record current business activity; monitor compliance with policies, rules, laws, etc.; provide corrective action when policies, rules, laws, etc. have not been followed; manage and mitigate risk throughout an organization; etc.

Scanning of application networks/systems for information may be performed by application management systems (e.g., a MSS system, a GRC system, etc.) that are tailored to the specific application networks/systems. For example, although a MSS system may scan the application networks/systems it supports, the MSS system may not be able to scan the application networks/systems supported by a GRC system (e.g., due to different formats of information obtained from the MSS-supported networks/systems and the GRC-supported networks/systems).

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide systems and/or methods that may scan a variety of application networks/systems for information provided in a variety of different formats. Since the systems and/or methods may scan for information in a variety of formats, the systems and/or methods may be scalable and reusable. In other words, the systems and/or methods may be agnostic (i.e., not customer dependent) and may be used to scan various application networks/systems without being custom tailored to a specific application network/system.

In an exemplary implementation, the systems and/or methods may schedule a scan of one or more devices associated with an application network/system, and may receive scan information, in different formats, from the one or more devices. The systems and/or methods may convert the scan information (e.g., provided in different formats) into a single normalized format, and may process the normalized scan information to produce enriched/normalized scan information. The systems and/or methods may store the enriched/normalized scan information and/or may provide the enriched/normalized scan information to an application management system (e.g., that manages the application network/system).

Figure 1:
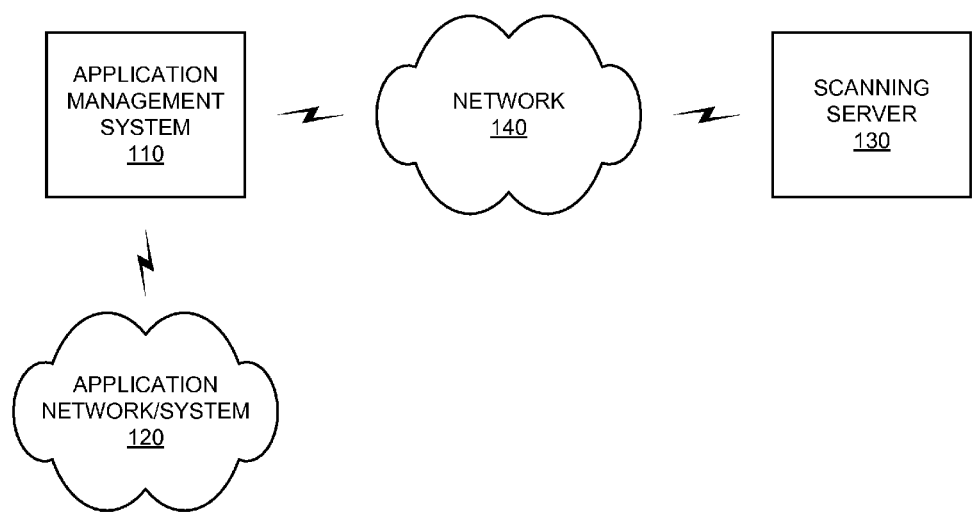
FIG. 1 is a diagram of an exemplary network in which systems and/or methods described herein may be implemented.

FIG. 1 is a diagram of an exemplary network 100 in which systems and/or methods described herein may be implemented. As illustrated, network 100 may include an application management system 110, an application network/system 120, and a scanning server 130 interconnected by a network 140. Components of network 100 may interconnect via wired and/or wireless connections. A single application management system 110, application network/system 120, scanning server 130, and network 140 have been illustrated in FIG. 1 for simplicity. In practice, there may be more application management systems 110, application networks/systems 120, scanning servers 130, and/or networks 140. Also, in some instances, one or more of the components of network 100 may perform one or more functions described as being performed by another one or more of the components of network 100.

Application management system 110 may include one or more server devices, or other types of computation or communication devices, that gather, process, search, and/or provide information in a manner described herein. In one exemplary implementation, application management system 110 may include a system that manages application network/system 120. In one example, application management system 110 may correspond to a MSS system that provides network security services for another entity's application networks/systems (e.g., application network/system 120). The MSS system may provide one or more of the following services: vulnerability assessments and penetration testing; management of network firewalls, maintaining firewall traffic routing rules, and generating regular traffic and management reports; intrusion detection management (e.g., at a network level or at an individual host level), providing intrusion alerts, and reporting intrusion attempts and activity; providing mitigation support after an intrusion has occurred; content filtering services (e.g., email and other traffic); and/or data archival.

In another example, application management system 110 may correspond to a GRC system that monitors and records current business activity; monitors compliance with policies, rules, laws, etc.; provides corrective action when policies, rules, laws, etc. have not been followed; manages and mitigates risk throughout an organization; etc. The GRC system may include a financial GRC system, an IT GRC system, and a legal GRC system. The financial GRC system may, for example, ensure correct operation of all financial processes, as well as compliance with any finance-related mandates. The IT GRC system may, for example, ensure that an IT organization supports current and future needs of a business, and complies with all IT-related mandates. The legal GRC system may, for example, attempt tie together the financial, IT, and legal GRC systems.

Application network/system 120 may include one or more networks/systems of any type. For example, application network/system 120 may include a local area network (LAN), a wide area network (WAN), a metropolitan area network (MAN), a telephone network, such as the Public Switched Telephone Network (PSTN) or Public Land Mobile Network (PLMN), an intranet, the Internet, an optical fiber (or fiber optic)-based network, or a combination of networks. Application network/system 120 may also include one or more devices (e.g., computation devices (e.g., servers, personal computers, laptops, etc.); communication devices (e.g., radiotelephones, personal communications system (PCS) terminals, wireless telephones, smart phones, personal digital assistants (PDAs), etc.); data transfer devices (e.g., gateways, routers, switches, firewalls, hubs, bridges, proxy servers, etc.); etc.) provided in any of the networks described above. In an exemplary implementation, application network/system 120 may include a network and/or system that may be managed by application management system 110. For example, if application management system 110 is a MSS system, application network/system may include intranets, email systems, accounting systems, data networks, financial systems, etc. managed by the MSS system.

Scanning server 130 may include one or more server devices, or other types of computation or communication devices, that gather, process, search, and/or provide information in a manner described herein. In one exemplary implementation, scanning server 130 may receive scan information from application network/system 120 (e.g., in a variety of formats), and may normalize the scan information into a single format. Scanning server 130 may process the normalized scan information to create enriched, normalized scan information, and may provide the enriched, normalized scan information to application management system 110. Further details of scanning server 130 are provided below in connection with, for example, FIGS. 2-4.

Network 140 may include one or more networks of any type. For example, network 140 may include a LAN, a WAN, a MAN, a telephone network, such as the PSTN or PLMN, an intranet, the Internet, an optical fiber (or fiber optic)-based network, or a combination of networks.

Although FIG. 1 shows exemplary components of network 100, in other implementations, network 100 may contain fewer, different, differently arranged, or additional components than depicted in FIG. 1.

Figure 2:
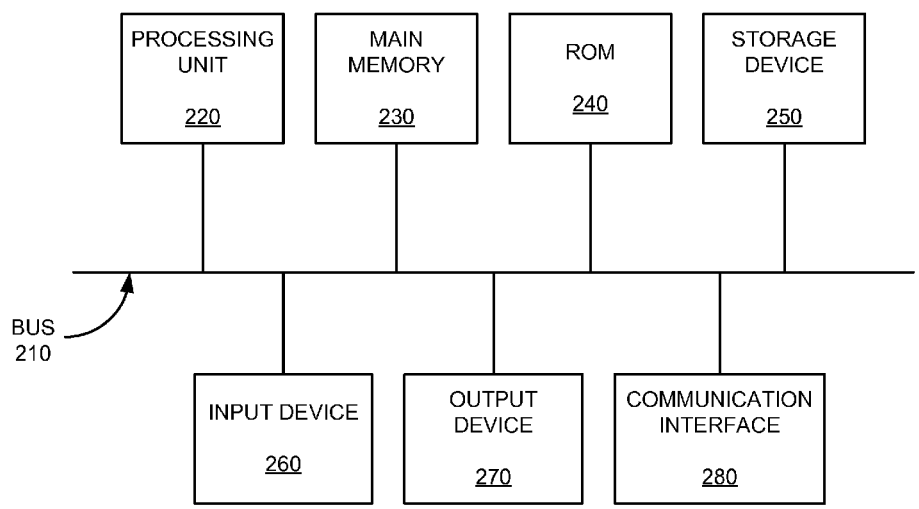
FIG. 2 is a diagram of exemplary components of an application management system and/or a scanning server of the network depicted in FIG. 1.

FIG. 2 is an exemplary diagram of a device 200 that may correspond to application management system 110 and/or scanning server 130. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include one or more random access memories (RAMs) or other types of dynamic storage devices that may store information and instructions for execution by processing unit 220. ROM 240 may include one or more ROM devices or other types of static storage devices that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a remote control, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 140.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. Alternatively, or additionally, one or more components of device 200 may perform one or more other tasks described as being performed by one or more other components of device 200.

Figure 3:
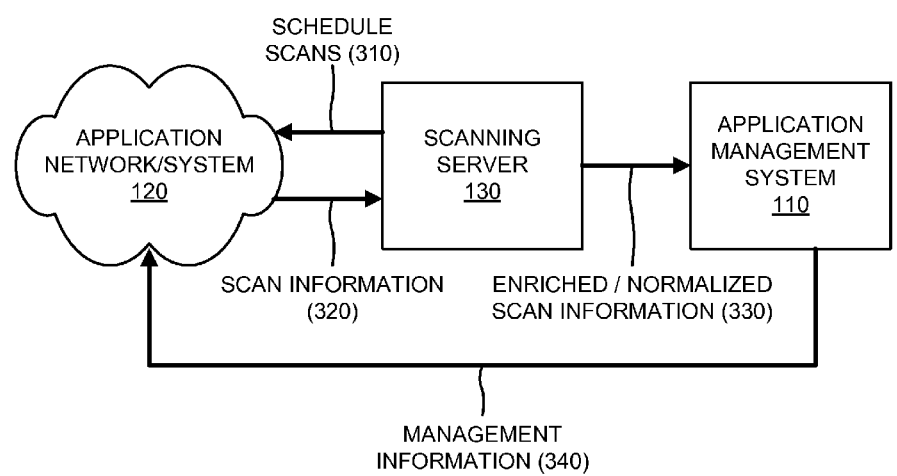
FIG. 3 is a diagram of exemplary interactions among components of an exemplary portion of the network depicted in FIG. 1.

FIG. 3 depicts a diagram of exemplary interactions among components of an exemplary portion 300 of network 100. As illustrated, exemplary network portion 300 may include application management system 110, application network/system 120, and scanning server 130. Application management system 110, application network/system 120, and scanning server 130 may include the features described above in connection with, for example, FIGS. 1 and 2.

As further shown in FIG. 3, scanning server 130 may schedule scans 310 with application network/system 120. In one example, scanning server 130 may schedule a scan of one or more devices (e.g., of components, devices, hardware, etc. of the device) associated with application network/system 120 at a particular time. In another example, scanning server 130 may schedule a scan of some of the devices associated with application network/system 120 at a first time, and may schedule a scan of other devices associated with application network/system 120 at a second time different than the first time. In still another example, scanning server 130 may schedule a periodic scan (e.g., with a particular frequency) of one or more devices associated with application network/system 120.

When the scheduled scan of application network/system 120 occurs, scanning server 130 may receive scan information 320 from application network/system 120. Scan information 320 include any information that may be retrieved or received from one or more devices (e.g., associated with application network/system 120) by scanning components, devices, hardware, software, etc. associated with the one or more devices. In an exemplary implementation, scanning server 130 may receive scan information 320, in different formats, from the one or more devices associated with application network/system 120. For example, one device associated with application network/system 120 may provide scan information 320 in an extensible markup language (XML) format, while another device associated with application network/system 120 may provide scan information 320 in a structured query language (SQL) format.

Scanning server 130 may convert scan information 320 (e.g., provided in different formats) into a single normalized format. In an exemplary implementation, scanning server 130 may convert the different formats of scan information 320 into a common result format (e.g., as specified by The MITRE Corporation). The common result format is a standardized IT asset assessment result format that facilitates the exchange of assessment results among systems to increase tool interoperability and allow for the aggregation of those results across large enterprises that utilize diverse technologies (e.g., to detect patch levels, policy compliance, vulnerability, asset inventory, and other tasks).

Scanning server 130 may process the normalized scan information. In one example, scanning server 130 may apply various rules (e.g., unusual use rules, critical assets rules, device classification rules, risk analysis rules, etc.) to the normalized scan information to produce rules metadata for the devices associated with application network/system 120. The rules metadata may include results (e.g., unusual use indications, device classification, risk information, etc.) of the application of the various rules. During the processing, scanning server 130 may also receive device metadata associated with the devices of application network/system 120. The device metadata may include information (e.g., manufacturer, model, capacity, etc.) associated with the devices of application network/system 120.

Scanning server 130 may generate unique identifiers for the devices associated with network/system 120, and may identify devices (e.g., of application network/system 120) associated with the normalized scan information based on the generated unique identifiers. Scanning server 130 may associate the rules metadata and/or the device metadata (e.g., for the identified devices associated with application network/system 120) with the normalized scan information to produce enriched/normalized scan information 330. Enriched/normalized scan information 330 may include scan information 320 that is enhanced by the application of the rules metadata, the device metadata, etc. Scanning server 130 may store enriched/normalized scan information 330 (e.g., in storage device 250 (FIG. 2)) and/or may provide enriched/normalized scan information 330 to application management system 110, as shown in FIG. 3.

Application management system 110 may receive enriched/normalized scan information 330, and may utilize enriched/normalized scan information 330 to generate management information 340 for application network/system 120. Management information 340 may include recommendations to improve application network/system 120; reports associated with compliance (e.g., with specifications, policies, standards, regulations, rules, laws, etc.) by application network/system 120; information instructing application network/system 120 to perform one or more actions; reports (e.g., vulnerability assessments, regular traffic and management reports, intrusion activity reports, etc.) about application network/system 120; etc. As further shown in FIG. 3, application management system 110 may provide management information 340 to application network/system 120. In one example, application network/system 120 may utilize or implement management information 340 to improve application network system 120.

Although FIG. 3 shows exemplary components of network portion 300, in other implementations, network portion 300 may contain fewer, different, differently arranged, or additional components than depicted in FIG. 3. Additionally, or alternatively, one or more components of network portion 300 may perform one or more other tasks described as being performed by one or more other components of network portion 300.

Figure 4:
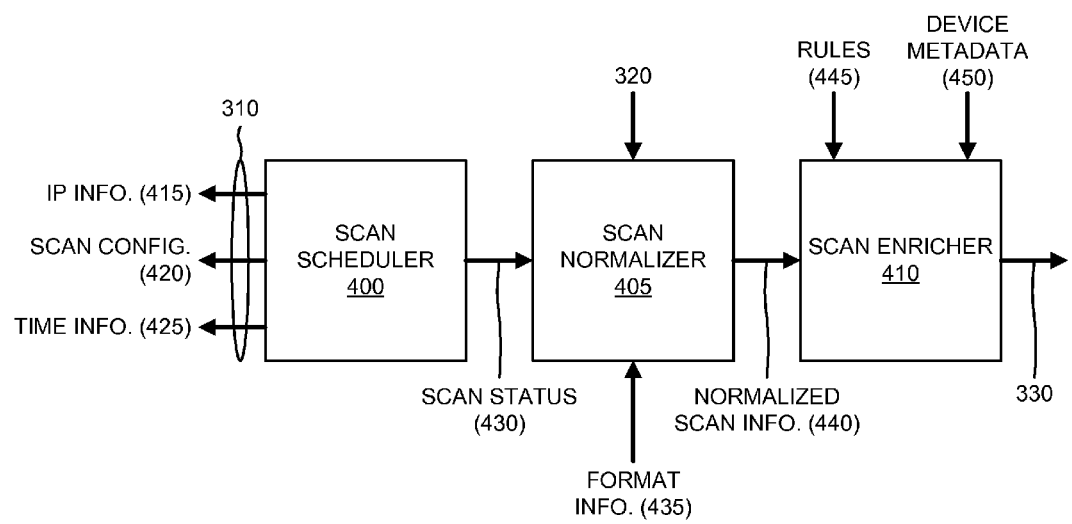
FIG. 4 is a diagram of exemplary functional components of the scanning server depicted in FIG. 1.

FIG. 4 is a diagram of exemplary functional components of scanning server 130. In one implementation, the functions described in connection with FIG. 4 may be performed by one or more components of device 200 (FIG. 2). As shown in FIG. 4, scanning server 130 may include a scan scheduler 400, a scan normalizer 405, and a scan enricher 410.

Scan scheduler 400 may include hardware or a combination of hardware and software that may provide an application programming interface (API) for scheduling scans (e.g., with application network/system 120). Scan scheduler 400 may perform load balancing and distribution of the scans of application network/system 120 (e.g., so that scanning server 130 does not become overloaded). As further shown in FIG. 4, scan scheduler 400 may schedule scans 310 of application network/system 120 based on Internet protocol (IP) information 415, a scan configuration 420, and/or time information 425. IP information 415 may include IP addresses (or ranges of IP addresses) associated with the one or more devices of application network/system 120 to be scanned. Scan configuration 420 may include information about a type of scan (e.g., a security scan, a compliance scan, etc.) to be performed on application network/system 120. Time information 425 may include information indicating when the scan will be performed, and a frequency of the scan. Scan scheduler 400 may provide a scan status 430 (e.g., indicating a progression (i.e., "scan 95% complete") of the scan) to scan normalizer 405.

Scan normalizer 405 may include hardware or a combination of hardware and software that may receive scan status 430 from scan scheduler 400, may receive scan information 320 from application network/system 120, and may receive format information 435. Format information 435 may include information that enables scan normalizer 405 to convert scan information 320 (e.g., provided in different formats) into a single normalized format (e.g. into normalized scan information 440). For example, format information 435 may include information regarding a selected normalized format (e.g., the common result format); information regarding how to map the different formats of scan information 320 into normalized scan information 440; etc. In an exemplary implementation, scan normalizer 405 may use format information 435 to convert scan information 320 (e.g., provided in different formats) into a common result format (e.g., as specified by The MITRE Corporation).

In another exemplary implementation, scan normalizer 405 may convert scan information 320 into normalized scan information 440 by mapping scan information 320 (e.g., operating system (OS), application, vulnerability, etc. information associated with scan information 320) to a common set of identifiers. In one example, if scan information 320 includes OS information, such as "MS Win 95," "Windows 95," etc., scan normalizer 405 may map this OS information to a common identifier (e.g., "Microsoft Windows 95"). In another example, scan normalizer 405 may map scan information 320 to a common set of identifiers using an industry standard technology identifier set (e.g., using common platform enumeration (CPE) provided by The MITRE Corporation). CPE is a structured naming scheme for information technology systems, platforms, and packages.

By converting the different formats of scan information 320 into normalized scan information 440 (e.g., into a single normalized format), scanning server 130 may be used to scan various application networks/systems without being custom tailored to a specific application network/system. As further shown in FIG. 4, scan normalizer 405 may provide normalized scan information 440 to scan enricher 410.

Scan enricher 410 may include hardware or a combination of hardware and software that may receive normalized scan information 440 from scan normalizer 405, may receive rules 445 and device metadata 450, and may process normalized scan information 440 to produce enriched/normalized information 330 based on rules 445 and/or device metadata 450. Rules 445 may include various rules used to extract particular information from normalized scan information 440. For example, rules 445 may include unusual use rules, critical assets rules, device classification rules, risk analysis rules, etc. Scan enricher 410 may apply rules 445 to normalized scan information 440 to produce rules metadata for the devices associated with application network/system 120. The rules metadata may include results (e.g., unusual use indications, device classification, risk information, etc.) of the application of rules 445. Device metadata 450 may include information (e.g., manufacturer, model, capacity, etc.) associated with the devices of application network/system 120.

Prior to processing normalized scan information 440, scan enricher 410 may generate unique identifiers for the devices associated with network/system 120. In an exemplary implementation, scan enricher 410 may generate unique hashes to assist in identifying devices (e.g., of application network/system 120) utilizing a dynamic host configuration protocol (DHCP). DHCP is a protocol for assigning dynamic IP addresses to devices on a network. With dynamic IP addressing, a device may have a different IP address every time the device connects to the network. In some systems, the device's IP address may change while it is still connected to the network. Such DHCP-based devices may be difficult to identify to due to the dynamic IP addresses. Scan enricher 410 may identify aspects of such DHCP-based devices that may not change, and may assign unique hashes for each identified aspect. For example, scan enricher 410 may assign the following unique hashes for a single device: Hash1(IPAddress), Hash2(HostName), Hash3(OSName^TCPPortStatus(22, 25, 80, 8080, 443, 3306, . . . )), Hash4(CPEAppNames[ ]), etc. In one implementation, scan enricher 410 may rank the unique hashes based on a likelihood of identifying a device. For example, "Hash2" may be ranked higher than "Hash1" since a host name associated with a particular device is less likely to change than an IP address associated with the particular device.

Scan enricher 410 may identify devices (e.g., of application network/system 120) associated with normalized scan information 440 based on the generated unique identifiers. For example, using the hash examples provided above, scan enricher 410 may attempt to identify a device using Hash1 (IPAddress), and, if unsuccessful, may attempt to identify the device using Hash2(HostName). Scan enricher 410 may continue this process until a device is identified. Once all of the devices associated with normalized scan information 440 are identified, scan enricher 410 may associate the rules metadata and/or the device metadata (e.g., for the identified devices associated with application network/system 120) with normalized scan information 440 to produce enriched/normalized scan information 330. Scan enricher 410 may provide enriched/normalized scan information 330 to application management system 110.

Although FIG. 4 shows exemplary functional components of scanning server 130, in other implementations, scanning server 130 may contain fewer, different, differently arranged, or additional functional components than depicted in FIG. 4. Alternatively, or additionally, one or more functional components of scanning server 130 may perform one or more other tasks described as being performed by one or more other functional components of scanning server 130.

FIGS. 5-8 are flow charts of an exemplary process 500 for scanning an application network/system for information according to implementations described herein. In one implementation, process 500 may be performed by scanning server 130. In another implementation, some or all of process 500 may be performed by another device or group of devices, including or excluding scanning server 130.

Figure 5:
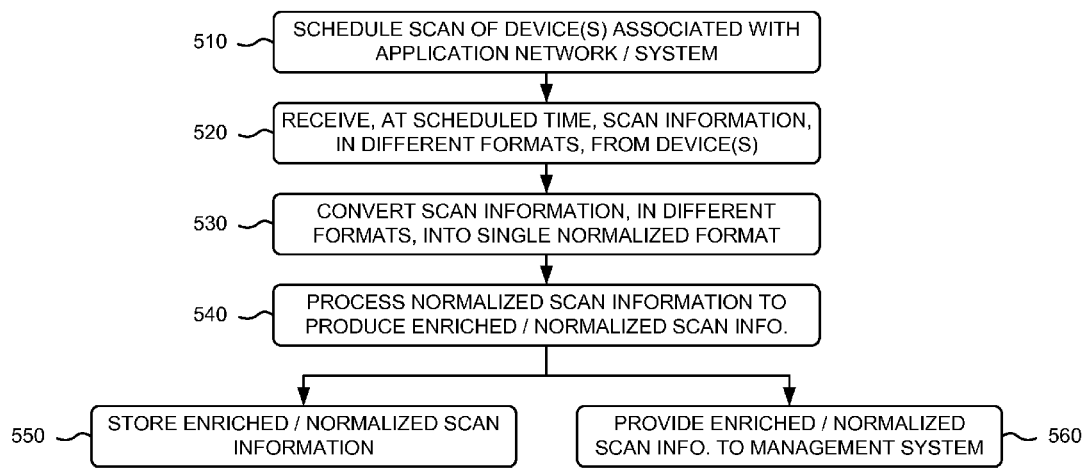
FIGS. 5-8 are flow charts of an exemplary process for scanning an application network/system for information according to implementations described herein.

As illustrated in FIG. 5, process 500 may include scheduling a scan of one or more devices associated with an application network/system (block 510), and receiving, at a scheduled time, scan information, in different formats, from the one or more devices (block 520). For example, in implementations described above in connection with FIG. 3, scanning server 130 may schedule scans 310 with application network/system 120. In one example, scanning server 130 may schedule a scan of one or more devices (e.g., of components, devices, hardware, etc. of the device) associated with application network/system 120 at a particular time. When the scheduled scan of application network/system 120 occurs, scanning server 130 may receive scan information 320 from application network/system 120. Scan information 320 include any information that may be retrieved or received from one or more devices (e.g., associated with application network/system 120) by scanning components, devices, hardware, software, etc. associated with the one or more devices. In one example, scanning server 130 may receive scan information 320, in different formats, from the one or more devices associated with application network/system 120.

As further shown in FIG. 5, the scan information, in different formats, may be converted into a single normalized format (block 530), and the normalized scan information may be processed to produce enriched/normalized scan information (block 540). For example, in implementations described above in connection with FIG. 3, scanning server 130 may convert scan information 320 (e.g., provided in different formats) into a single normalized format. In one example, scanning server 130 may convert the different formats of scan information 320 into a common result format (e.g., as specified by The MITRE Corporation). Scanning server 130 may process the normalized scan information. In one example, scanning server 130 may associate the rules metadata and/or the device metadata (e.g., for the identified devices associated with application network/system 120) with the normalized scan information to produce enriched/normalized scan information 330. Enriched/normalized scan information 330 may include scan information 320 that is enhanced by the application of the rules metadata, the device metadata, etc.

Returning to FIG. 5, process 500 may include storing the enriched/normalized scan information (block 550) and/or providing the enriched/normalized scan information to a management system (block 560). For example, in implementations described above in connection with FIG. 3, scanning server 130 may store enriched/normalized scan information 330 (e.g., in storage device 250) and/or may provide enriched/normalized scan information 330 to application management system 110.

Figure 6:
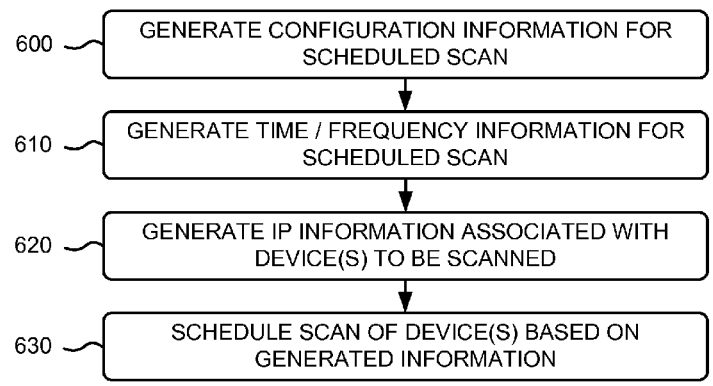

Process block 510 may include the process blocks depicted in FIG. 6. As shown in FIG. 6, process block 510 may include generating configuration information for the scheduled scan (block 600), generating time/frequency information for the scheduled scan (block 610), generating IP information associated with the one or more devices to be scanned (block 620), and scheduling the scan of the one or more devices based on the generated information (block 630). For example, in implementations described above in connection with FIG. 4, scan scheduler 400 of scanning server 130 may schedule scans 310 of application network/system 120 based on IP information 415, scan configuration 420, and/or time information 425. IP information 415 may include IP addresses (or ranged of IP addresses) associated with the one or more devices of application network/system 120 to be scanned. Scan configuration 420 may include information about a type of scan (e.g., a security scan, a compliance scan, etc.) to be performed on application network/system 120. Time information 425 may include information indicating when the scan will be performed, and a frequency of the scan.

Figure 7:
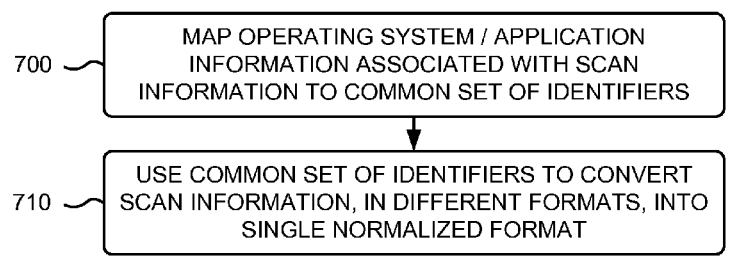

Process block 530 may include the process blocks depicted in FIG. 7. As shown in FIG. 7, process block 530 may include mapping operating system information and application information associated with the scan information to a common set of identifiers (block 700), and using the common set of identifiers to convert the scan information, in different formats, into the single normalized format (block 710). For example, in implementations described above in connection with FIG. 4, scan normalizer 405 of scanning server 130 may convert scan information 320 into normalized scan information 440 by mapping scan information 320 (e.g., operating system (OS), application, vulnerability, etc. information associated with scan information 320) to a common set of identifiers. In one example, if scan information 320 includes OS information, such as "MS Win 95," "Windows 95," etc., scan normalizer 405 may map this OS information to a common identifier (e.g., "Microsoft Windows 95"). In another example, scan normalizer 405 may map scan information 320 to a common set of identifiers using an industry standard technology identifier set (e.g., using CPE).

Figure 8:
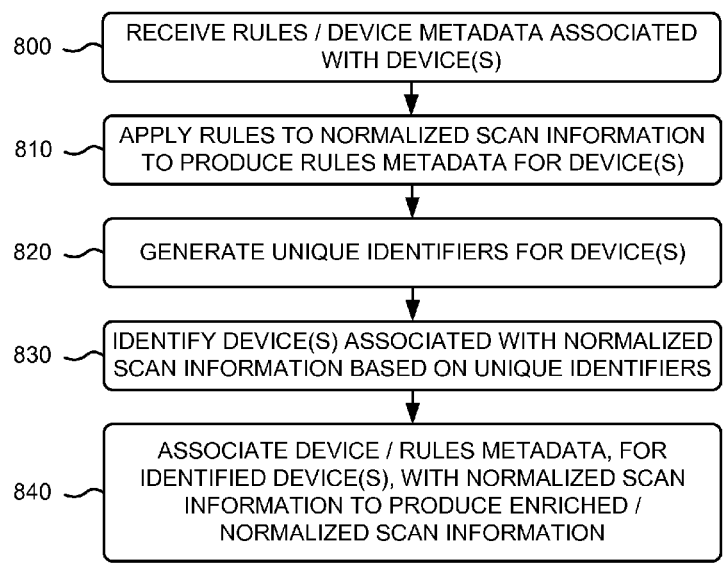

Process block 540 may include the process blocks depicted in FIG. 8. As shown in FIG. 8, process block 540 may include receiving rules and device metadata associated with the one or more devices (block 800), and applying the rules to the normalized scan information to produce rules metadata for the one or more devices (block 810). For example, in implementations described above in connection with FIG. 4, scan enricher 410 of scanning server 130 may receive normalized scan information 440 from scan normalizer 405, and may receive rules 445 and device metadata 450. Rules 445 may include various rules used to extract particular information from normalized scan information 440. For example, rules 445 may include unusual use rules, critical assets rules, device classification rules, risk analysis rules, etc. Scan enricher 410 may apply rules 445 to normalized scan information 440 to produce rules metadata for the devices associated with application network/system 120. The rules metadata may include results (e.g., unusual use indications, device classification, risk information, etc.) of the application of rules 445. Device metadata 450 may include information (e.g., manufacturer, model, capacity, etc.) associated with the devices of application network/system 120.

As further shown in FIG. 8, process block 540 may include generating unique identifiers for the one or more devices (block 820), identifying device(s) associated with the normalized scan information based on the unique identifiers (block 830), and associating the device metadata and the rule metadata, for the identified device(s), with the normalized scan information to produce the enriched/normalized scan information (block 840). For example, in implementations described above in connection with FIG. 4, prior to processing normalized scan information 440, scan enricher 410 may generate unique identifiers for the devices associated with network/system 120. In one example, scan enricher 410 may generate unique hashes to assist in identifying devices (e.g., of application network/system 120) utilizing a DHCP. Scan enricher 410 may identify devices (e.g., of application network/system 120) associated with normalized scan information 440 based on the generated unique identifiers. Once all of the devices associated with normalized scan information 440 are identified, scan enricher 410 may associate the rules metadata and/or the device metadata (e.g., for the identified devices associated with application network/system 120) with normalized scan information 440 to produce enriched/normalized scan information 330.

Implementations described herein may provide systems and/or methods that may scan a variety of application networks/systems for information provided in a variety of different formats. Since the systems and/or methods may scan for information in a variety of formats, the systems and/or methods may be scalable and reusable. In other words, the systems and/or methods may be used to scan various application networks/systems without being custom tailored to a specific application network/system. In an exemplary implementation, the systems and/or methods may identify devices (e.g., DHCP-based devices) associated with scan information so that the scan information may be associated with the correct devices. In another exemplary implementation, the systems and/or methods may normalize the scan information (e.g., provided in different formats) into a single normalized format, and may enrich (e.g., with metadata) the normalized scan information to produce enriched/normalized scan information.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 5-8, the order of the blocks may be modified in other implementations. Further, non-dependent blocks may be performed in parallel.

It will be apparent that exemplary aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method comprising:
   scheduling, by the computing device, a scanning device to perform a scan of one or more devices;
   receiving, by the computing device and at a scheduled time, scan information from the scan, by the scanning device, of the one or more devices,
      the scan information being received in two or more different formats;
   converting, by the computing device and using information regarding a single normalized format and information regarding how to map the two or more different formats into normalized scan information, the scan information, received in the two or more different formats, into the single normalized format to form the normalized scan information,
      converting the scan information including:
         mapping operating system information and application information associated with the scan information to a common set of identifiers; and
         using the common set of identifiers to convert the two or more different formats of the scan information into the single normalized format; and
   processing, by the computing device, the normalized scan information to produce enriched, normalized scan information,
      the processing of the normalized scan information including:
         receiving device metadata including information associated with the one or more devices being scanned,
         generating unique identifiers for the one or more devices,
         iteratively identifying, based on the unique identifiers, at least one of the one or more devices associated with the normalized scan information, and
         associating, for the identified at least one of the one or more devices, the device metadata with the normalized scan information to produce the enriched, normalized scan information.

2. The computing device-implemented method of claim 1, further comprising:
   storing the enriched, normalized scan information; and
   providing the stored enriched, normalized scan information to an application management system associated with the one or more devices.

3. The computing device-implemented method of claim 1, where the single normalized format comprises a common result format.

4. The computing device-implemented method of claim 1, where scheduling the scanning device to perform the scan of the one or more devices comprises:
   generating configuration information for the scan;
   generating time information for the scan;
   generating Internet protocol (IP) information associated with the one or more devices to be scanned; and
   scheduling the scan of the one or more devices based on the generated configuration information, the generated time information, and the generated IP information.

5. The computing device-implemented method of claim 1, where processing the normalized scan information further comprises:
   receiving rules associated with the one or more devices;
   applying the rules to the normalized scan information to produce rules metadata for the one or more devices; and
   associating, for the identified at least one of the one or more devices, the rules metadata with the normalized scan information to produce the enriched, normalized scan information.

6. The computing device-implemented method of claim 1, where the unique identifiers comprise unique hashes to identify the one or more devices.

7. The computing device-implemented method of claim 6, where at least one of the one or more devices utilizes a dynamic host configuration protocol (DHCP), and
   where generating unique identifiers for the one or more devices includes:
      identifying aspects of the one of the one or more devices that do not change based on the DHCP, and
      assigning the unique hashes to the one or more devices based on the identified aspects.

8. The computing device-implemented method of claim 1, where the computing device comprises a scanning server.

9. A device comprising:
   a memory to store a plurality of instructions; and
   a processor to execute instructions in the memory to:
      schedule one or more scanning devices to perform a scan of one or more devices,
      receive, from the one or more scanning devices, scan information associated with the scan of the one or more devices,
         the received scan information being provided in two or more different formats,
      receive device metadata associated with the one or more devices being scanned,
      convert, using information regarding a single normalized format and information regarding how to map the two or more different formats into normalized scan information, the received scan information, in the two or more different formats, into the single normalized format to form the normalized scan information,
         the processor, when converting the scan information, being further to:
            map operating system information and application information associated with the scan information to a common set of identifiers, and
            use the common set of identifiers to convert the two or more different formats of the scan information into the single normalized format, and
      process the normalized scan information to produce enriched, normalized scan information,
         the processor, when processing the normalized scan information, being to:
            identify unique identifiers for the one or more devices,
            iteratively identify, based on the unique identifiers, at least one of the one or more devices associated with the normalized scan information, and
            associate, for the identified at least one of the one or more devices, the device metadata with the normalized scan information to produce enriched, normalized scan information.

10. The device of claim 9, where the processor is further to at least one of:
    store the enriched, normalized scan information in the memory, or
    provide the enriched, normalized scan information to an application management system associated with the one or more devices.

11. The device of claim 9, where the single normalized format comprises a common result format.

12. The device of claim 9, where, when scheduling the one or more scanning devices to perform the scan of the one or more devices, the processor is further to:
generate configuration information for the scan,
generate time information for the scan,
generate Internet protocol (IP) information associated with the one or more devices to be scanned, and
schedule the scan of the one or more devices based on the generated configuration information, the generated time information, and the generated IP information.

13. The device of claim 9, where the processor is further to:
generate the unique identifiers.

14. The device of claim 9, where, when associating the device metadata with the normalized scan information, the processor is further to:
receive rules associated with the one or more devices,
apply the rules to the normalized scan information to produce rules metadata for the one or more devices, and
associate the rules metadata with the normalized scan information to produce the enriched, normalized scan information.

15. The device of claim 9, where the unique identifiers comprise unique hashes to identify the one or more devices.

16. A non-transitory computer-readable memory device that stores instructions, the instructions comprising:
one or more instructions which, when executed by a processor, cause the processor to schedule a scanning device to perform a scan of one or more devices;
one or more instructions which, when executed by the processor, cause the processor to receive scan information from the scan of the one or more devices,
the scan information being received in two or more different formats;
one or more instructions which, when executed by the processor, cause the processor to convert, using information regarding a single normalized format and information regarding how to map the two or more different formats into normalized scan information, the scan information, received in the two or more different formats, into the single normalized format to form the normalized scan information,
the one or more instructions to convert the scan information including:
one or more instructions to map operating system information and application information associated with the scan information to a common set of identifiers, and
one or more instructions to use the common set of identifiers to convert the two or more different formats of the scan information into the single normalized format; and
one or more instructions which, when executed by the processor, cause the processor to enrich the normalized scan information to produce enriched, normalized scan information,
the one or more instructions to cause the processor to enrich the normalized scan information including:
one or more instructions to receive device metadata including information associated with the one or more devices,
one or more instructions to receive rules associated with the one or more devices,
one or more instructions to apply the rules to the normalized scan information to produce rules metadata for the one or more devices, and
one or more instructions to associate the device metadata and the rules metadata with the normalized scan information to produce the enriched, normalized scan information.

17. The computing device-implemented method of claim 1, where the device metadata includes information associated with one or more of:
a manufacturer associated with a particular device, of the one or more devices,
a model associated with the particular device, or
a functional feature associated with the particular device.

18. The non-transitory computer-readable memory device of claim 16, where the instructions further include at least one of:
one or more instructions to store the enriched, normalized scan information in a memory; or
one or more instructions to provide the enriched, normalized scan information to an application management system.

19. The non-transitory computer-readable memory device of claim 16, where the one or more instructions to schedule the scanning device to perform the scan of the one or more devices further include:
one or more instructions to generate configuration information for the scan;
one or more instructions to generate time information for the scan;
one or more instructions to generate Internet protocol (IP) information associated with the one or more devices to be scanned; and
one or more instructions to schedule the scan of the one or more devices based on the generated configuration information, the generated time information, and the generated IP information.

20. The non-transitory computer-readable memory device of claim 16, where the single normalized format comprises a common result format.

* * * * *